United States Patent [19]
Tongi

[11] 3,983,330
[45] Sept. 28, 1976

[54] TDM SWITCHING NETWORK FOR CODED MESSAGES

[75] Inventor: Erich Tongi, Viroflay, France

[73] Assignee: International Standard Electric Corporation, New York, N.Y.

[22] Filed: Apr. 11, 1975

[21] Appl. No.: 567,120

[30] Foreign Application Priority Data
Apr. 18, 1974 France .................... 74.13453

[52] U.S. Cl. .................................. 179/15 AT
[51] Int. Cl.² .................................. H04J 3/00
[58] Field of Search ......... 179/15 AT, 15 A, 15 AQ

[56] References Cited
UNITED STATES PATENTS

| | | |
|---|---|---|
| 3,735,049 | 5/1973 | Buchner et al. ............ 179/15 AQ |
| 3,766,322 | 10/1973 | Moffett et al. ............ 179/15 BV |
| 3,851,105 | 11/1974 | Regnier et al. ............ 179/15 AT |
| 3,920,914 | 11/1975 | Regnier et al. ............ 179/15 AT |

Primary Examiner—Thomas W. Brown
Attorney, Agent, or Firm—James B. Raden; Marvin M. Chaban

[57] ABSTRACT

A time-space-time division switching network for transmitting multiplexed signals. A speech memory is associated with each incoming time switch for the first stage and with each outgoing time switch for the final stage. The intermediate space switching stage has plural parallel planes which are independent of one another and each plane is capable of transmitting messages in serial form. The memories allow regrouping of messages from parallel planes into serial form for output over a single multiplex line.

7 Claims, 5 Drawing Figures

TDM SWITCHING NETWORK FOR CODED MESSAGES

This invention concerns a switching network for coded signals transmitted by the method of time-division multiplexing.

In a time-division multiplex transmission system, each multiplex line transmits a certain number of binary messages in time succession during a repetitive period or frame. Each message is composed of a group of binary signals or bits and occupies a particular time slot, or time channel, within a frame. The sequence of messages transmitted over the same time channel in all the successive frames constitutes the information transmitted between two users.

A multiplex switching network, used especially in pulse-code modulation (PCM) telephone transmission systems, should permit a message appearing on a time channel of an incoming multiplex line to be transmitted to any time channel of any outgoing multiplex line. When such a switching network is used in telephone communications, each message represents the coded value of a sample of the analog speech signal. A sampling frequency of 8 kHz, and a multiplexing of 256 time channels on the same line transmitting messages of eight bits, are usually, although not obligatorily, used.

This multiplex switching network may, for example, be of the known type called T-S-T (time-space-time) in which the multiplexed messages appearing on the incoming line are registered in turn in an incoming message memory particular to this incoming line, then transferred by means of a space switch to an outgoing message memory particular to the outgoing line in question, which delivers the different stored messages in time succession.

It is common practice to use a space switch consisting of a number of space switching planes, comprising switching elements or crosspoints, equal to the number of bits constituting a message, with the bits being transmitted in parallel form to the different planes and the crosspoint selected in each plane consequently transmitting only one bit per message.

In such a space switch, a failure (in the power supply, for example) occurring in any switching plane results in the erroneous transmission of all the messages. A known method to overcome this total degradation of transmission is to add another space switch which goes into operation when a failure is detected in one of the planes of the first switch. This solution is costly and requires additional space. Another solution, described in the French patent No. 71 07697 filed on March 5, 1971, consists in adding an extra standby plane placed in the circuit to substitute for a defective plane. This solution still increases the already large number of planes required, and consequently the number of crosspoints and linking wires.

One object of the present invention is a multiplex switching network for binary messages, arranged to reduce the number of space switching planes required for the transmission of these messages.

Another object of the invention is a multiplex switching network for binary messages permitting the loss of transmission capacity to be reduced to a minimum in case of failure of one or even more space switching planes.

According to one characteristic of the invention, several space switching planes are provided, each independent from the other, each transmitting different messages in serial form, with means for switching and transmitting in serial form messages corresponding to the various time channels of each of the incoming multiplex lines in turn to each of the said space switching planes, and means for regrouping the messages coming from these different planes and destined to be transmitted over the same outgoing multiplex line.

Other objects, characteristics and advantages of this invention will be brought out in the following description of a preferred embodiment, the said description being made in relation with the attached drawings in which.

In the following description, given as an example, one will consider messages of eight bits transmitted over 256 time channels per multiplex line at the rate of 16 megabauds.

Figure 1:
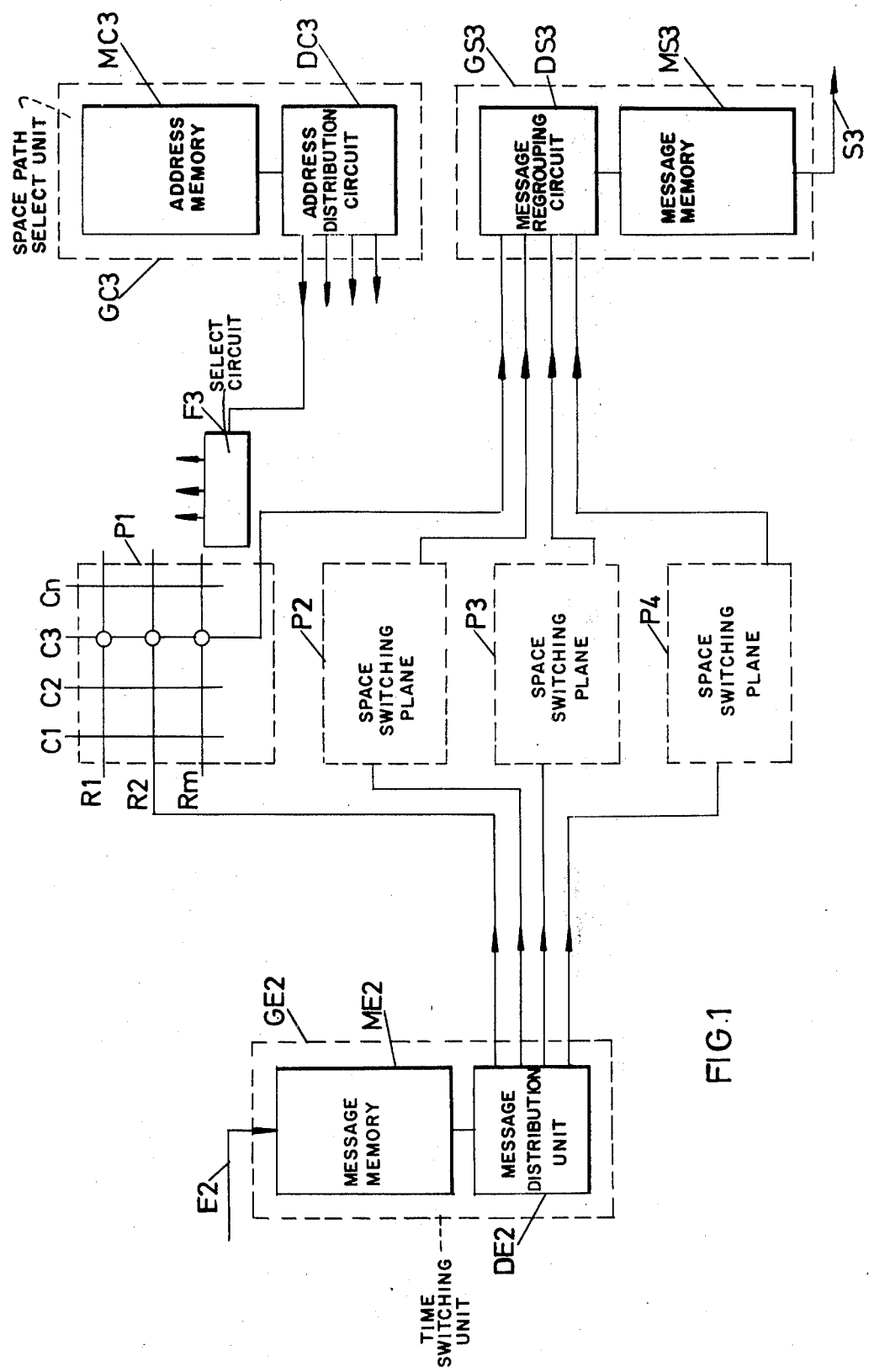
FIG. 1 is a block diagram of the switching network according to the invention.

FIG. 1 is a block diagram of the switching network according to the invention. It includes a set of space switching planes P1, P2, P3, P4, each composed of a switching matrix with $m$ horizontal lines referenced R1 to $Rm$ on FIG. 1 and $n$ vertical lines referenced C1 to $Cn$, the homologue horizontal lines of the different planes, such as R2, being connected to a given incoming multiplex line, such as E2, by means of an incoming time switching unit, such as GE2, while the homologue vertical lines of the different planes, such as C3, are connected to a given outgoing multiplex line, such as S3, by means of an outgoing time switching unit, such as GS3. Each switching matrix therefore has as many horizontal lines as incoming multiplex lines and incoming time switching units, and as many vertical lines as outgoing multiplex lines and outgoing time switching units. An electronic crosspoint, built in known TTL integrated circuit or other design, placed at the intersection of each horizontal and vertical line of the different matrices, connects, when it is closed, the corresponding horizontal and vertical lines.

The incoming time switching unit GE2 consists of a message memory ME2 with 256 cells corresponding to the 256 incoming time channels, registering the messages occupying these 256 channels, whose output delivers in parallel form, and in an order independent of the order of entry, the said messages to a message distribution circuit DE2 controlled by a timing unit not shown, having four outputs switching and transmitting the messages in serial form in turn to each of the four space switching planes. The outgoing time switching unit GS3 consists of a message memory MS3 with 256 cells registering a parallel form the messages delivered by a message regrouping circuit DS3 also controlled by the timing unit and receiving at four inputs respectively the messages coming from the four space switching planes in serial form. The message memory MS3 successively delivers the messages corresponding to the different time channels of the outgoing multiplex line S3.

A space path selecting unit, such as GC3, associated with the homologue vertical lines of the different switching planes, such as C3, controls, by means of four selecting circuits, such as F3, respectively associated with the four switching planes and located near these, the closing of one of the m crosspoints placed on the corresponding vertical line in each of the switching planes.

Thus, there are as many space path selecting units as outgoing time switching units or outgoing multiplex lines.

The space path selecting unit GC3 consists of an address memory MC3 registering the addresses of crosspoints to be selected which are placed on the vertical line C3 of the different planes, these addresses being read in turn in parallel form and transferred to an address distribution circuit DC3, similar to the message distribution circuit DE2 and also controlled by the timing unit, having four outputs switching and transmitting serially the addresses of the said crosspoints in turn to each of the four space switching planes.

Instead of associating the space path selecting units with the homologue vertical lines of the various space switching planes, one could associate them with the homologue horizontal lines, in which case there would be as many space path selecting units as incoming time switching units or incoming multiplex lines.

Since, in practice, the space switching planes are often located at a relatively long distance from the time switching units and space path selecting units, and since there is noise in the electrical environment, noise immunity is increased by placing a line transmitter and receiver (not shown in the figure) respectively at the ends of each of the linking conductors.

It will be noted that FIG. 1 shows a multiplex switching network permitting one-way communications between incoming multiplex lines, such as E2, and outgoing multiplex lines, such as S3. In order to obtain two-way message transmission, an outgoing multiplex line and an outgoing time switching unit are associated with each incoming multiplex line and incoming time switching unit, and conversely, the crosspoints are doubled, each permitting transmission in one direction.

The operation of the above-described switching network will now be explained using the example of a single incoming multiplex line E2 connected to a single outgoing multiplex line S3, so that the operation may be easily understood without changing the principle.

At the beginning of each time slot $t1, t2, \ldots, t256$, very close to 0.5 $\mu$sec and equal to the channel time of the multiplex lines, the message memory ME2 is addressed to be read and the corresponding message is transmitted to the message distribution circuit DE2 in parallel form. This circuit routes the received messages in turn to the different space switching planes P1 to P4 and transmits them in serial form across the corresponding crosspoint to the message regrouping circuit DS3, the time required for the complete transmission of a message being four time slots, i.e. 2 $\mu$sec. At the beginning of each time slot $t1, t2, \ldots, t256$, the message regrouping circuit DS3 delivers successively and in parallel form the received messages which are then registered in the message memory MS3 to be transmitted over the outgoing multiplex line S3. A time shift of four time slots is observed between the reading of a message in memory ME2 and its entry into memory MS3, assuming the time to be negligible for the reading and writing of the message memories as well as for the transmission within the message distribution and regrouping circuits and over the linking conductors. Thus the message read in the message memory ME2 at the beginning of time slot $t1$, and transferred in parallel form to the message distribution circuit DE2, will be routed to plane P1 and transmitted in serial form at the rate of four megabauds during time slots $t1, t2, t3$ and $t4$ through the corresponding crosspoint to be received in the message regrouping circuit DS3 from which it will be entered in parallel form in the message memory MS3 at the beginning of time slot $t5$. Then the message read in the message memory ME2 at the beginning of time slot $t2$ will be routed to plate P2 and transmitted during time slots $t2, t3, t4$ and $t5$ to the message regrouping circuit DS3 from which it will be entered in the message memory MS3 at the beginning of time slot $t6$, etc. . . . . Plane P1 transmits messages read in the message memory ME2 at the beginning of time slots $t1, t5, t9, \ldots, t253$; plane P2 transmits messages read at the beginning of time slots $t2, t6, t10, \ldots, t254$; plane P3 transmits messages read at the beginning of time slots $t3, t7, t11, \ldots, t255$; and lastly, plane P4 transmits messages read at the beginning of time slots $t4, t8, t12, \ldots, t256$.

The crosspoints of the various space switching planes are controlled in the following way. At the beginning of each time slot $t1$ to $t256$, the address memory MC3 is read and the address of the corresponding crosspoint is transferred in parallel form to the address distribution circuit DC3. This circuit, operating in the same way and synchronously with the message distribution circuit DE2, routes the received addresses in turn to each of the four selecting circuits such as F3 associated with the space switching plane P1, and transmits them in serial form at the rate of four megabauds; the transmission time of an address is therefore four time slots. Each selecting circuit decodes the address received and controls the closing of the corresponding crosspoint at the beginning of the message transmission through this crosspoint. Thus, selecting circuit F3 controls the closing of the corresponding crosspoint at the beginning of the time slot $t1$, the selecting circuit associated with plane P2 controls the closing of the corresponding crosspoint at the beginning of the time slot $t2$, etc. . . .

Because of the shift of four time slots between the reading of a crosspoint address in the address memory MC3 and the closing of this crosspoint, such an address must be read four time slots in advance with respect to the reading of the corresponding message in the message memory ME2.

It will be noted that with such a switching network each communication between two users requires only one switching plane out of the four and each plane transmits only one quarter of the communications. Thus, the failure of one space switching plane (for example a power failure) affects only one quarter of the communications without affecting the other three quarters. Therefore, only a minimum of the transmission capacity is lost.

In FIG. 1 we have chosen, as an example, a space switch with four planes, but the principle of this invention can be applied just as well to a two-plane or eight-plane space switch. It should be noted however that the message transmission rate in the system is inversely proportional to the number of planes used.

Figure 2:
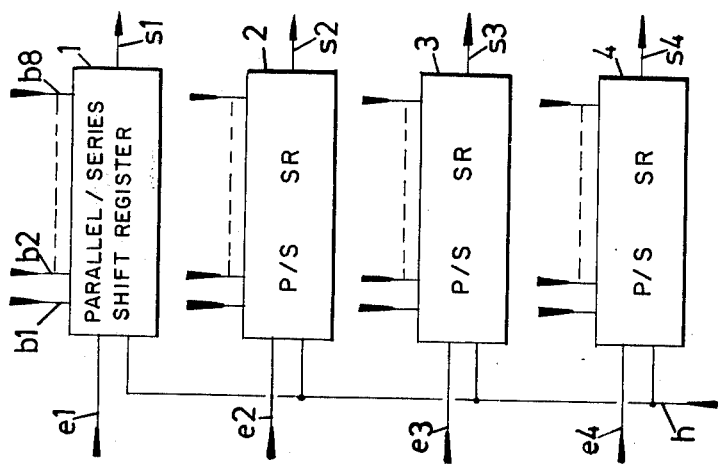
FIG. 2 is a block diagram of an embodiment of the message distribution circuit DE2 of FIG. 1.

FIG. 2 shows an embodiment of the message distribution circuit DE2 in FIG. 1. It includes four parallel-series conversion circuits which, for example, are shift registers 1, 2, 3 and 4 whose eight parallel inputs $b1$, $b2$, ..., $b8$ receive respectively the eight bits of the messages read in time succession in the message memory associated with the said distribution circuit. Timing pulses coming from the timing unit at a frequency of 4 MHz appear at an input $h$ of the four shift registers and control the serial advance of the message bits at each of the outputs $s1$ to $s4$, at a rate of four megabauds. Inputs $e1$ to $e4$ associated respectively with the four shift registers are energized in turn, by means of the timing unit, at the beginning of the time slots $t1$ to $t256$, allowing the corresponding register to register the message present at the inputs $b1$ to $b8$ of all the registers. Thus, at the beginning of time slot $t1$, input $e1$ of the shift register 1 is energized and the message present at the inputs $b1$ to $b8$ is stored in this register 1 and transmitted in serial form at the rate of four megabauds to output $s1$. Then, at the beginning of time slot $t2$, input $e2$ of shift register 2 is energized and the message present at this moment is stored in this register and transmitted to output $s2$ at the rate of four megabauds, etc. . . . The messages transmitted in serial form to the outputs $s1$ to $s4$ of the different shift registers 1 to 4 are each shifted by one time slot with respect of the others.

The address distribution circuit DC3 in FIG. 1 associated with the address memory MC3 is identical to the message distribution circuit DE2 described above, except that the type of information received is different.

Figure 3:
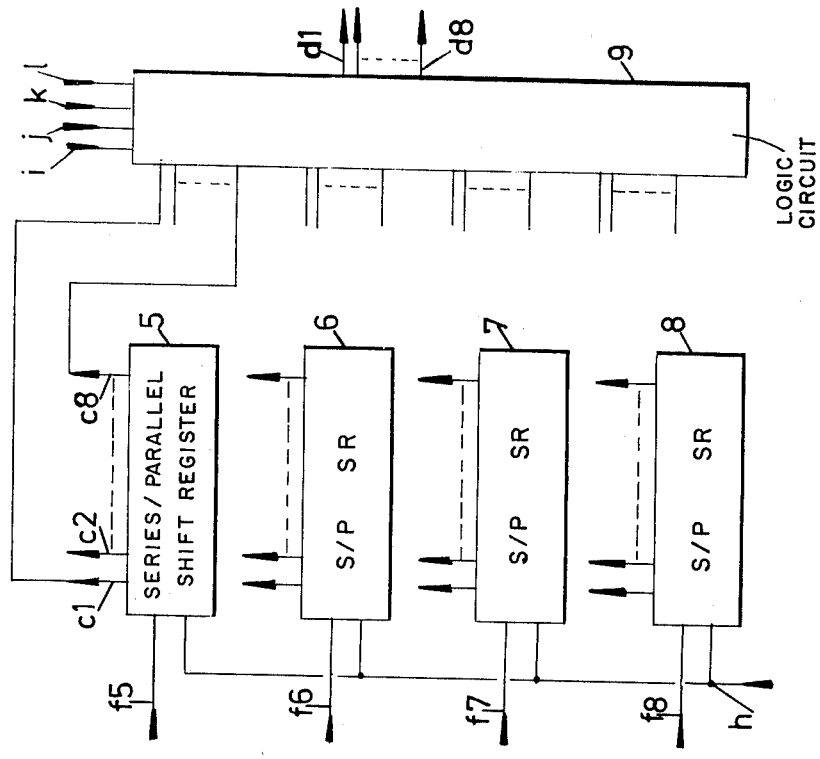
FIG. 3 is a block diagram of an embodiment of the message regrouping circuit DS3 of FIG. 1.

FIG. 3 shows an embodiment of the message regrouping circuit DS3 in FIG. 1. It contains four series-parallel conversion circuits which are, for example, four shift registers 5, 6, 7 and 8, receiving at inputs $f5$, $f6$, $f7$ and $f8$ the messages in serial form coming from the space switching planes P1 to P4 respectively, at the rate of four megabauds, and delivering each of the messages in parallel form at outputs $c1$ to $c8$ under the control of the previously described clock pulses at the frequency of 4 MHz arriving at the input $h$ of the said shift registers. The outputs $c1$ to $c8$ of the four registers are connected to the inputs of a logic circuit 9 whose four inputs $i, j, k$ and $l$ are in turn activated at the beginning of the time slots $t1$ to $t256$, by means of the signals coming from the timing unit. The activation of inputs $i$, $j$, $k$ and $l$ permits transmission of the message present at the output of a given shift register to the parallel outputs $d1$ to $d8$ of logic circuit 9. Thus, at the beginning of time slot $t1$, input $i$ of the logic circuit 9 is activated and the message stored in shift register 5 during the four preceding time slots is available at the parallel outputs $d1$ to $d8$, in order to be registered in a message memory, as described above. Then, at the beginning of time slot $t2$, input $j$ is activated and the message stored in shift register 6 during the four preceding time slots is available at the parallel outputs $d1$ to $d8$, etc. . . . At the beginning of each time slot $t1$ to $t256$, a message is available in parallel form at the outputs $d1$ to $d8$ of logic circuit 9.

Figure 4:
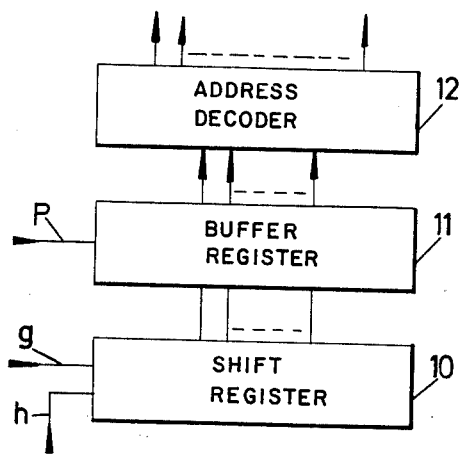
FIG. 4 is a block diagram of an embodiment of the selecting circuit F3 of FIG. 1.

FIG. 4 shows an embodiment of the selection circuit F3 in FIG. 1, associated with the crosspoints of the vertical line C3 of plane P1. It includes a series-parallel conversion circuit which is, for example, a shift register 10, receiving at one input $g$ the addresses of the crosspoints to be selected, at the rate of four megabauds, and at another input $h$ the timing pulses from the timing unit at a frequency of 4 MHz. The shift register 10 continuously delivers in parallel form the bits received in serial form to the buffer register 11 which becomes transparent when an input $p$ is activated by a signal coming from the timing unit at the beginning of time slots $t1$, $t5$, $t9$, . . . , $t253$ and connected to an address decoder 12 whose different outputs respectively control the closing of the crosspoints present on the vertical line C3 of plane P1 in FIG. 1.

Thus, for example, at the beginning of time slot $t5$, the complete address of a crosspoint stored in shift register 10 during time slots $t1$, $t2$, $t3$ and $t4$ is transferred to the outputs of the buffer register 11 which holds it until input $p$ is again activated, that is to say until the beginning of time slot $t9$. The corresponding output of the address decoder 12 will therefore be activated during time slots $t5$, $t6$, $t7$ and $t8$, the controlled crosspoint consequently being closed. At the beginning of time slot $t9$, either a new complete address is present at the output of the shift register 10 and another crosspoint of the same vertical line is closed, or the same address is again present at the output of shift register 10 and the same crosspoint as before will be closed.

Figure 5:
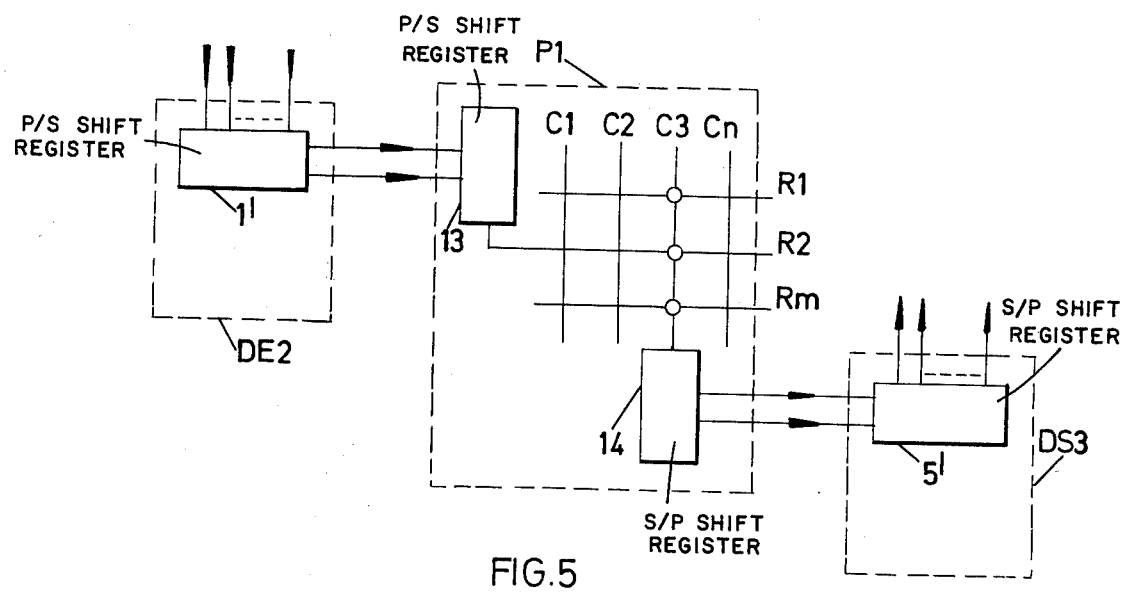
FIG. 5 is a block diagram of a circuit for obtaining a mode of serial-parallel transmission of message bits over links between the time switching units and the space switching planes.

FIG. 5 shows the block diagram of a circuit for obtaining a mode of serial-parallel transmission of message bits over the links between the time switching units and the space switching planes. Transmission speed is often limited on these links, by reason of their length and the high noise electrical environment, whereas the serial transmission of message bits inside the space switching planes can be accomplished at higher speeds. The serial-parallel principle of transmission, such as shown in FIG. 5, allows matching the transmission of message bits over these links between the time switching units and space switching planes at a transmission speed of four megabauds across the space switching planes.

In FIG. 5, one recognizes the space switching plane P1 of FIG. 1 as well as the parallel-series conversion circuit 1 of the message distribution circuit DE2, somewhat modified and referenced 1', and the series-parallel conversion circuit 5 of the message regrouping circuit DS3, also modified and referenced 5'. The parallel-series conversion circuit 1' has two outputs which simultaneously transmit, by means of appropriate signals coming from the timing unit, two consecutive bits of the message entered in parallel form, at half the rate of the case in FIG. 1, i.e., two megabauds. The message bits thus transmitted to the space switching plane P1 arrive at the two parallel inputs of a parallel-series conversion circuit 13, a shift register for example, which delivers the message bits at the horizontal line R2 at the rate of four megabauds, by means of appropriate signals coming from the timing unit.

The same transmission speed conversion process is used to transmit message bits coming from the space switching plane P1 and going to the message regrouping circuit DS3. A series-parallel conversion circuit 14, a shift register for example, receives the message bits in serial form coming from the vertical line C3 at a rate of four megabauds and simultaneously delivers at two parallel outputs the consecutive bits received, at the rate of two megabauds. Then these bits are registered in pairs in the series-parallel conversion circuit 5', from which they are delivered in parallel form.

The number of parallel outputs from circuits 1' and 14 is of course not limited to two. There can be more, in which case the transmission speed would be even lower.

In order to further reduce the loss of transmission capacity within the space switch in case of a failure of a switching plane, an extra standby plane can be added to the other switching planes, which would replace the defective plane. This solution is particularly advantageous with respect to this invention because the defective plane will be quickly identified due to the fact that a single plane is used for the serial transmission of a message, and consequently the standby plane will enter into action very quickly.

A variant of the invention consists in transmitting the messages inside the space switch in hybrid series-parallel form, with the set of space switching planes divided into independent groups of planes transmitting different messages, each of the planes of one group serially transmitting only one part of a message while the other parts of this message are transmitted in serial form respectively by the other planes of the group.

Although this invention has been described in connection with particular embodiments, it is clearly not limited to the said embodiments and is capable of other variants or modifications still falling within its scope. In particular, it can be applied, after some modifications, to a multiplex switching network called S-T-S (space-time-space).

I claim:

1. A switching network for receiving coded messages in serial form from a plurality of multiple-channel multiplex lines and for transmitting said messages in serial form to multiple-channel multiplex output lines comprising, means for converting said messages from serial to parallel form, said switching network including a plurality of identical space-division switching planes, each plane comprised of a plurality of crosspoints of intersecting alignments of conductors, with one alignment of conductors representing input lines and the other alignment representing output lines, each of said switching planes being completely independent of one another, conductors in each alignment grouped homologously with conductors in the remaining planes, means for controlling the crosspoints, each switching plane being capable of transmitting a different complete message in serial form through its own crosspoints, said switching network further including means for converting messages received at the input of said network in serial form into parallel form corresponding to respective different channels of the network for routing successive messages to the successive input conductors of a group in said parallel planes, means for transmitting each message in serial form across the respective space switching planes, and means for regrouping messages received in serial form from the respective planes for transmission over the respective multiplex output lines.

2. A switching network for coded messages according to claim 1, including message memories associated with the respective incoming multiplex lines, wherein the means for transmitting messages in serial form to each of the said space-division switching planes include as many message distribution circuits as there are incoming multiplex lines, and said message distribution circuits include as many parallel-series conversion circuits as there are space-division switching planes, each of the said parallel-series conversion circuits of a message distribution circuit delivering in serial form to its associated switching plane the messages received in parallel form from the associated message memory.

3. A switching network for coded messages according to claim 1, further including message memories associated with the outgoing multiplex lines, wherein the means for regrouping messages coming in serial form from the different space-division switching planes include as many message regrouping circuits as there are outgoing multiplex lines, and said message regrouping circuits include as many series-parallel conversion circuits as there are space switching planes, each of the series-parallel conversion circuits of a message regrouping circuit receptive of messages in serial form from a switching plane associated therewith and each message regrouping circuit including a logic circuit controlled by signals coming from a timing unit for delivering these messages in time succession in parallel form to the associated message memory.

4. A switching network for coded messages according to claim 1, wherein the means for controlling crosspoints include address memories each representing the address of a crosspoint to be closed, and address distribution circuits associated with the respective address memories permitting these crosspoint addresses to be routed and transmitted in turn to each of the space switching planes.

5. A switching network for coded messages according to claim 4, wherein each address memory is associated with the same alignment of conductors in different space switching planes and each address memory is connected to an address distribution circuit for routing and transmitting in serial form addresses received in parallel form from its address memory in turn to crosspoint selecting circuits respectively associated with the different space switching planes.

6. A switching network for coded messages according to claim 2 wherein each message between the message distribution or message regrouping circuits on the one hand, and the space-division switching planes on the other hand, is transmitted in hybrid series-parallel form over two or more conductors.

7. A switching network for coded messages transmitted by time-division multiplexing over multiplex lines each having several time channels, including a set of identical space-division switching planes comprised of crosspoints at the intersections of input lines and output lines, and means for controlling the said crosspoints, wherein said set of space-division switching planes is divided into groups of planes, with each group completely independent from each other group, and each group being capable of transmitting different messages, each of the planes of one group transmitting in serial form only one message of a communication while the other messages of said communication are transmitted respectively by the other planes of the said group, said network further including means for storing messages at the input of said network, means for distributing messages for serial transmission through said planes, and means for regrouping messages at the output of said network.

* * * * *